UNITED STATES PATENT OFFICE.

RICHARD STEINAU AND CHARLES STEINAU, OF BRUNSWICK, GERMANY.

IMPROVEMENT IN PREPARATION OF PEROXIDE OF IRON.

Specification forming part of Letters Patent No. 206,635, dated July 30, 1878; application filed April 25, 1878.

*To all whom it may concern:*

Be it known that we, RICHARD STEINAU and CHARLES STEINAU, of Brunswick, in the Empire of Germany, have invented a new and useful Improvement in Coloring Matters Prepared from Iron, which improvement is fully set forth in the following specification.

This invention relates to a certain novel process for producing and collecting peroxide of iron; and the same is carried into effect by causing water contained in a suitable vessel to rise and fall through a layer or mass of iron-scraps arranged upon a sieve supported by the vessel, in such a manner that the said scraps are subjected or exposed to the alternate action of water and of atmospheric air, whereby the peroxide of iron is collected in the vessel containing the water.

In carrying out our invention, we take iron-scrap and bring the same alternately in contact with water and then with atmospheric air, whereby a pure hydrated peroxide of iron is obtained, free from by-products, such as hydrated protoxide of iron, or from other salts or acids. From this pure hydrated peroxide of iron we can produce red, yellow, black, and other coloring matters of superior quality and purity.

Heretofore such coloring matters have either been obtained in their natural state by mining, or they have been manufactured from the secondary products or refuse of chemical works; but in both cases the products are more or less impure, and they have not the desired strength of color.

In order to obtain pure colors, they should necessarily be produced from the purest materials, and to be produced economically they must be manufactured without the use of acids. For this purpose we use the oxygen of the air to produce a strong and sufficient oxidation of the iron.

Our present invention consists of an improved method of doing this by exposing the iron to the action of water, which is caused to circulate or move in such a manner that air can have sufficient access to operate at intervals upon the iron for the purpose of completing its oxidation.

We prefer to employ wrought-iron scraps, such as the chips from turning-lathes, which present an extended surface to the water and to the air, and, on account of their structures, allow a free circulation through them to both.

We place the iron-scraps upon a sieve, which is secured in the top of a box or vat filled with water close up to said sieve and provided with a piston or plunger, so that by moving this plunger the water is alternately caused to rise up through the sieve and then to recede in the manner employed in machines for separating ore well known by the term "jigs." As the piston moves in one direction, therefore, the iron-scraps become immersed in the water, and when the piston recedes, the water falls back, and the air, following it, has free access to the wet surfaces of the iron-scraps, causing a powerful oxidation, whereby hydrated peroxide of iron is formed, which is immediately washed off by the next movement of the water.

After this process has been continued for some time the motion of the piston is stopped, so as to allow the hydrated peroxide to settle on the bottom of the vat or chamber, from which it is finally drawn off together with the water by suitable valves or faucets. The vat is then filled with fresh water, the piston is again set in motion, and the process is repeated as often as may be desired.

The water and hydrated peroxide of iron, produced as above described, are passed into a receiving box or trough provided with a corrugated bottom, in the concave parts of which the impure particles accumulate, while the remaining products flow from this trough into a receiving-vessel, and are finally separated from the water by filtration and pressure.

The cakes of material thus obtained are finally placed in a drying-chamber, and when dry they consist of pure hydrated peroxide of iron.

What we claim as new, and desire to secure by Letters Patent, is—

The within-described process of producing and collecting peroxide of iron by causing water contained in a suitable vessel to rise and fall through a layer or mass of iron-scraps, thereby exposing said scraps to the alternate action of water and atmospheric air, and collecting the peroxide in the vessel containing the water, substantially as described.

In testimony that we claim the foregoing we have hereunto set our hands this 13th day of October, 1877.

RICHARD STEINAU.
CHARLES STEINAU.

Witnesses:
WILLIAMS C. FOX,
JOHS. KRACK.